(12) United States Patent
Zhu et al.

(10) Patent No.: US 9,307,072 B2
(45) Date of Patent: Apr. 5, 2016

(54) METHOD AND APPARATUS FOR PERFORMING A FUNCTION IN AN ELECTRONIC DEVICE

(75) Inventors: Xiao-Feng Zhu, Nanjing (CN); Xiang-Yu Zong, Nanjing (CN)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 341 days.

(21) Appl. No.: 13/517,457

(22) PCT Filed: Dec. 22, 2009

(86) PCT No.: PCT/CN2009/001531
§ 371 (c)(1),
(2), (4) Date: Jun. 20, 2012

(87) PCT Pub. No.: WO2011/075866
PCT Pub. Date: Jun. 30, 2011

(65) Prior Publication Data
US 2012/0266092 A1   Oct. 18, 2012

(51) Int. Cl.
*H04M 1/725* (2006.01)
*G06F 3/0484* (2013.01)
*G06F 3/01* (2006.01)
*G06F 3/042* (2006.01)
*G06F 3/0486* (2013.01)
*G06F 3/0488* (2013.01)

(52) U.S. Cl.
CPC ............ *H04M 1/72583* (2013.01); *G06F 3/016* (2013.01); *G06F 3/017* (2013.01); *G06F 3/0428* (2013.01); *G06F 3/0484* (2013.01); *G06F 3/0486* (2013.01); *G06F 3/04886* (2013.01); *H04M 2250/22* (2013.01)

(58) Field of Classification Search
CPC ....... G06F 3/017; G06F 3/0428; G06F 3/048; G06F 3/0481; G06F 3/0482; G06F 3/0484–3/0489

USPC ......... 715/739, 748, 764, 769, 773, 806, 807, 715/810–814, 840, 863, 864
See application file for complete search history.

(56) References Cited

U.S. PATENT DOCUMENTS 6,441,823 B1 *  8/2002  Ananya ................... 345/442
2002/0164040 A1 * 11/2002  Yang ....................... 381/150

(Continued)

FOREIGN PATENT DOCUMENTS

| CN | 101226455 A | 7/2008 |
| CN | 101431566 A | 5/2009 |
| WO | 2007035827 A2 | 3/2007 |

OTHER PUBLICATIONS

Patent Cooperation Treaty, "Notification of Transmittal of the International Search Report and the Written Opinion of the International Searching Authority, of the Declaration" for International Application No. PCT/CN2009/001531, Sep. 23, 2010, 11 pages.

*Primary Examiner* — Tadeese Hailu
*Assistant Examiner* — Shangao Zhang
(74) *Attorney, Agent, or Firm* — Morris & Kamlay LLP

(57) ABSTRACT

A method and apparatus for performing a function in an electronic device includes an electronic device displaying 110 a first set of elements on a touch-sensitive display. Then the device receives 115 a first input on the touch-sensitive display, wherein the first input selects at least one element from the first set of elements. Then the device determines 120 that the first input has continued on a path from the at least one element to an edge of the touch-sensitive display. In response to the determining, the device calculates 130 a target key based on at least one characteristic of the path. After calculating, the device senses 155 an activation of the target key by a user. Subsequently, when the target is pressed the device performs 165 the function associated with the target key on the at least one element.

19 Claims, 10 Drawing Sheets

(56) References Cited

U.S. PATENT DOCUMENTS

| | | |
|---|---|---|
| 2005/0237308 A1 | 10/2005 | Autio et al. |
| 2006/0035659 A1 | 2/2006 | Yoon et al. |
| 2008/0180306 A1* | 7/2008 | McRae .................. 341/176 |
| 2008/0215980 A1 | 9/2008 | Lee et al. |
| 2008/0282179 A1 | 11/2008 | Kim et al. |
| 2009/0079699 A1 | 3/2009 | Sun |
| 2009/0113330 A1* | 4/2009 | Garrison et al. ............. 715/769 |
| 2009/0187842 A1* | 7/2009 | Collins et al. ................ 715/769 |
| 2011/0122085 A1* | 5/2011 | Chang ........................ 345/174 |

* cited by examiner

METHOD AND APPARATUS FOR PERFORMING A FUNCTION IN AN ELECTRONIC DEVICE

FIELD OF THE DISCLOSURE

The present disclosure relates generally to a method and apparatus for performing a function in an electronic device using a user interface and more particularly to a user interaction that combines a touch operation and a key operation.

BACKGROUND

Presently, there are many electronic devices that implement graphical user interface displays. In these electronic devices, the user can perform simple manipulation of icons such as cut, copy, and paste. Also, user can launch a software application by clicking, double-clicking, or tapping (in the case of touch-sensitive) a displayed icon.

There is an opportunity to define additional graphical user interface functions to provide quick and user-friendly interactions.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
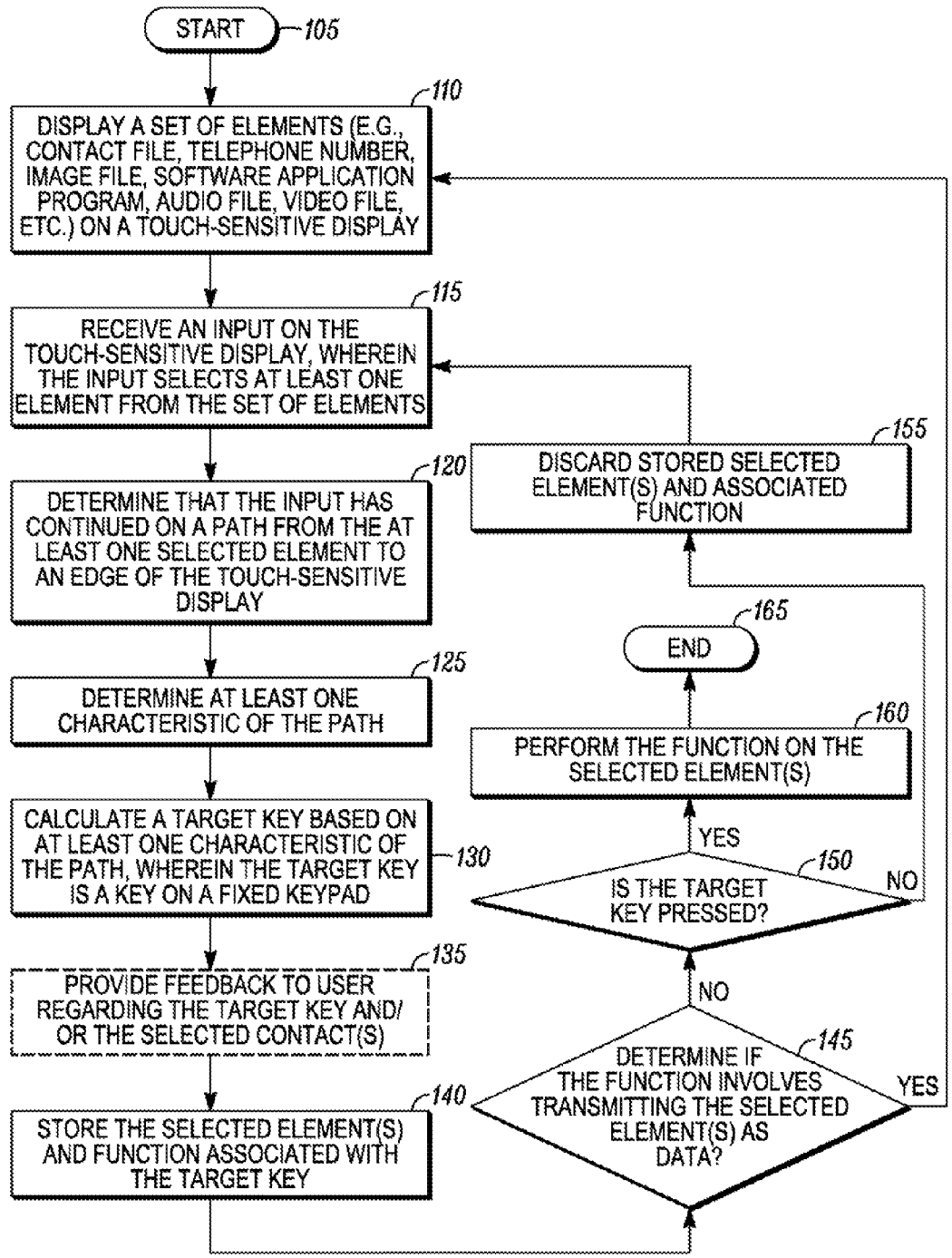
FIG. 1 is a flowchart for performing a function in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method and an apparatus provide a graphical user interface to perform a function in an electronic device. The method includes an electronic device that displays a first set of elements on a display that may be a touch-sensitive display. The first set of elements may be contacts, telephone numbers, software applications programs, multimedia files, etc. Then the device receives a first input on the touch-sensitive display, wherein the first input selects at least one element from the first set of elements. Then the device determines that the first input has continued on a path from the at least one element to an edge of the touch-sensitive display.

In response to the determining, the device calculates a target key based on at least one characteristic of the path. The target key may be a physical key outside of the touch-sensitive display. The physical key can be a hard key, which has a fixed functionality, or a soft key, a key whose functionality can be changed by the software application being used in the electronic device.

After calculating, the device senses an activation of the target key by a user. Subsequently, when the target key is pressed, the device performs the function associated with the target key on the at least one element. Thus, by using a combination of a physical key and a touch input on a touch-sensitive display, a user can easily select a desired number of elements and perform a function on the selected elements.

An electronic device performs a function using a combination of a graphical user interface operation and a key operation. The electronic device includes a display for displaying a first set of elements, a housing having at least a physical target key beyond the boundaries of the display, and a processor for performing a function associated with the target key and at least one element selected from the first set of elements. The first set of elements may be contacts, telephone numbers, software application programs, multimedia files, etc.

The electronic device's processor receives a first input that selects at least one element from the first set of elements. Then the processor determines that the first input has continued on a path from the at least one element to an edge of the display. Now, the processor calculates the target key based on at least one characteristic of the path. The physical key can be a hard key, having a fixed functionality, or a soft key, a key whose functionality can be changed by the software application being used in the electronic device. After the processor senses an activation of the target key, the processor performs a function associated with the target key and the at least one element. As a result, by using a combination of a physical key and a touch input on a touch-sensitive display, a user can easily select a desired number of elements and perform a function on the selected elements.

FIG. 1 is a flowchart 100 for performing a function in accordance with some embodiments. The method commences with the user entering 105 an application in which the user wishes to perform a particular function. The application may be a phone book, a photo gallery, a video gallery, a multimedia application, etc. In response to the user entering the application, the electronic device displays 110 a first set of elements on a touch-sensitive display. The first set of elements may include a set of contacts, a set of data files, a set of photographs, a set of multimedia files, a list of software applications, etc. The first set of elements displayed on the display is determined by the application started by the user.

The user then selects one or more elements from the first set of elements displayed on the touch-sensitive display. The user may use a finger or a stylus to select one or more elements. It should also be noted that at any particular time the device may display one or more types of elements simultaneously. For example, the device may display a set of contacts on a first portion of the touch-sensitive display and a set of multimedia files on a second portion of the touch-sensitive display. Also, although the display is presumed to be a touch-sensitive display in this embodiment, the display can be a non-touch-sensitive display and the user input can be received using a mouse, touchpad or other type of touch-sensitive panel that can be clear or opaque, or other non-key-based graphical user interface input.

As a result of the selection, the electronic device receives 115 an input on the touch-sensitive display. The input selects one or more elements from the set of elements. Now, the electronic device determines 120 that the input has continued on a path from the selected element(s) to an edge of the touch-sensitive display. For example, the user may drag a finger from the selected element displayed on the touch-sensitive display to the edge of the display. Of course, the touch-sensitive display does not sense any inputs beyond its edges. As a result, the device determines that the path followed by the finger is from the selected element to the edge of the touch-sensitive display.

Then the electronic device determines 125 one or more characteristics of the path followed by the input. The characteristics of the path may include a direction of a tangent of the path at the edge of the touch-sensitive display or a number of times the path crosses itself.

Now the device calculates 130 a target key based on the characteristic(s) of the path. The target key will be a physical key beyond the edges of the touch-sensitive display. For example, the electronic device may calculate the tangent formed at the edge of the display by the path followed by the input. If the tangent of the path points to a particular physical key, then that key is calculated to be the target key. A physical key is a key present on a physical or a fixed keypad. A physical key can be a hard key or a soft key. A hard key is a key that has a fixed functionality associated with it. Whereas, a soft key is a key whose functionality can be changed by a software application currently in use by the device. Optionally, the electronic device provides 135 a feedback to the user regarding the target key and/or the selected element(s). The feedback may be provided by flashing the backlight of the target key. The backlight may flash in a predetermined manner based the selected element(s). For example, if the user has selected call contacts, then the backlight may always stay on. However, if the user has selected data files, then the backlight may flash at a pre-determined interval. Alternately, if the device determines that two elements have been selected using a single path, the backlight might flash twice (once for each element selected). In some other embodiments, the electronic device may provide an audio or haptic feedback to the user. For example, the device may beep or vibrate based on the target key or the number of selected elements.

After calculating the target key, the device stores 140 the selected element(s) and a function associated with the target key. It should be noted here that the characteristic of the path may be used to assist in selecting the function to be performed on the selected element(s). For example, if the path crosses itself once and the physical key is a "filing" key, then the function to be performed by the electronic device may be to copy the selected element(s) to another folder. However, if the path crosses itself twice then the function to be performed by the electronic device may be to delete the selected element(s). In another example, the device may perform different functions based on a slope of the tangent of the path. In this example, a positive slope and a negative slope results in different functions to be performed on the selected element(s). Also, the function associated with the target key may be a predetermined function for which the target key is specifically present. For example, a push-to-talk (PTT) key is a side key and is used specifically for establishing a PTT call between the user and a desired contact. However, if the target key is a soft key, then the function associated with it changes with the application that is being used by the device.

Subsequently, the device determines 145 if the function associated with the target key involves transmitting the selected element(s) as data. The determination may be based on the calculated target key and the type of element(s) selected. For example, if the selected element(s) is a data file and the target key is calculated to be a "call" key, then the device determines that the function involves transmitting the selected element(s) as data. However, if the device determines that the function does not involve transmitting the selected element(s) as data, then the device checks 150 if a target key is pressed. For example, if the selected element is a contact and the target key is a "call" key, then the device determines that the user wishes to call the selected contact. Then, the function does not involve transmitting the selected element as data. When the device determines 150 that the target key is pressed, the device performs 160 the function associated with the target key on the selected element(s) and the process ends 165.

However, if the device determines 150 that the target key is not pressed and instead another element(s) is selected from the first set of elements displayed on the touch-sensitive display, then the stored selected element(s) and the function associated with the target key are discarded 155 and the process loops back to receiving 115 an input on the touch-sensitive display. It should be noted here that the device has already received the input. The input is the selection of another element(s) that is displayed on the touch-sensitive display.

In another embodiment, the device waits for a predetermined period of time after the selection of one or more elements. If the target key is not pressed within the predetermined amount of time then the device discards 155 the stored element(s) and the function associated with the target key and the process loops back to receiving 115 an input on the touch-sensitive display.

After storing 145 the selected element(s) and the function associated with the target key, if the device determines 145 that the function involves transmitting the selected element(s) as data, then the process loops back to displaying 110 a second set of elements on the touch-sensitive display. The second set of elements displayed on the touch-sensitive display may be the same as the first set of elements displayed on the touch-sensitive display in one example or may be different from the first set of elements displayed on the touch-sensitive display in another example. Then, the device receives 115 a second input on the touch-sensitive display. The second input selects element(s) from the second set of elements. In response, the device determines 120 that the second input has continued on a second path from the other element(s) to an edge of the touch-sensitive display and, after determining 125 at least one characteristic of the second path, the device calculates 130 the target key based on the second path. After calculating, the electronic device stores 140 the other element(s) and the function associated with the target key. These other element(s) are stored along with the selected element(s). In an embodiment, all the elements may be stacked one after the other in a memory. Also, the function associated with the target key may be commands that the device follows to execute the function associated with the target key.

Then the device determines 145 if the function involves transmitting the other element(s). Because previously the user had selected a data file, perhaps the other element(s) are not data files. However, a case may exist that the selected files are data files, in that case the process loops back to displaying 110 a third set of elements. The third set of elements may or may not be the same as the first set of elements (or the second set of elements) displayed on the touch-sensitive display.

After determining that the selected other element(s) are not data files, the device senses 150 an activation of the target key, and then the device performs 160 the function associated with the target key, the selected element(s), and the other selected element(s). After that, the process ends 165.

However, if the target key is not pressed and instead the device receives a third input on the touch-sensitive display, then the device discards 155 the stored other element(s) and the function associated with the target key and loops back to the receiving 115 the third input.

Thus, the user is able to easily perform a function on a selected set of elements using the touch-sensitive display and the target key.

Figure 2A:
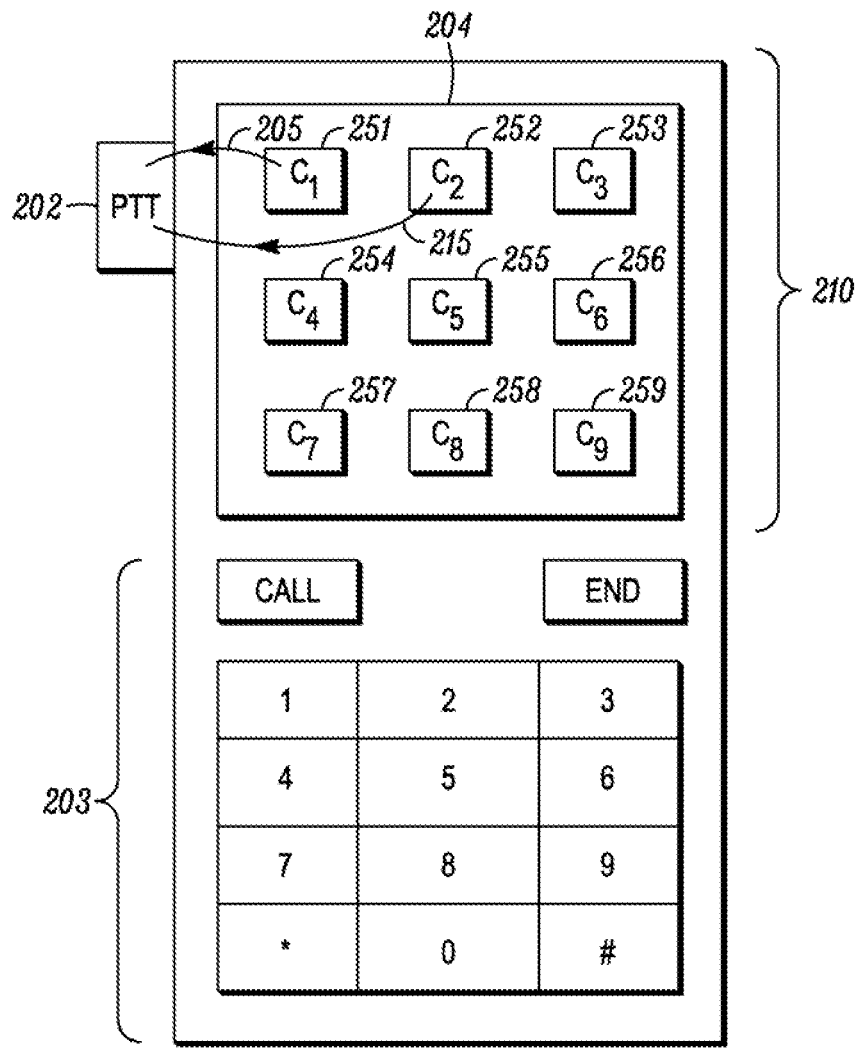
FIGS. 2A-2C are screen views of an electronic device demonstrating various methods of selecting elements in accordance with some embodiments.
Figure 2B:
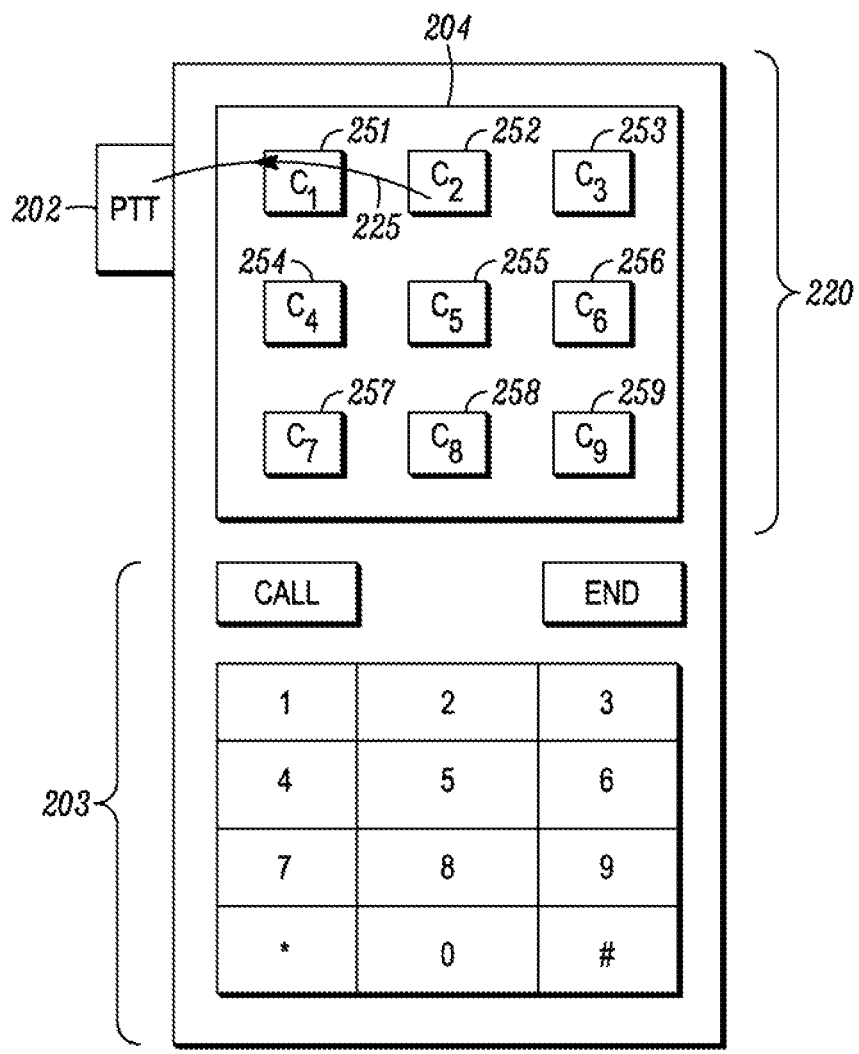
Figure 2C:
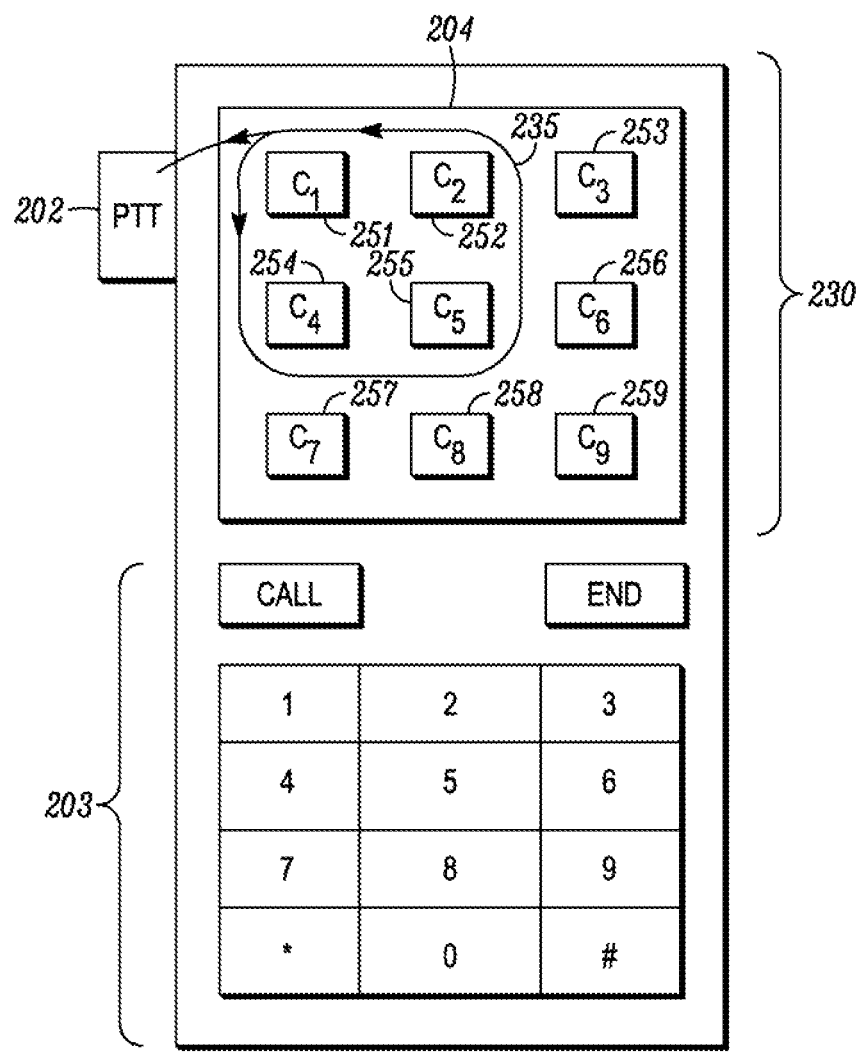

FIGS. 2A, 2B, and 2C illustrate screen views 210, 220, and 230 respectively and demonstrate three different implementations for selecting one or more elements from the displayed elements in accordance with some embodiments. Depending on the software application in use, user preference, and/or manufacturer settings, one of these implementations may be used by the device at a given time. Given these detailed descriptions, a person of ordinary skill in the art may create other implementations for selecting one or more elements from the display elements.

FIG. 2A illustrates screen view 210 of an electronic device 200 demonstrating a method of selecting a contact in accordance with some embodiments. FIG. 2A provides an implementation that selects only one element (contact) at a time. This allows for secure selection of that single element, and easily allows for display changes between elements, but may become time-consuming if more than one element is regularly selected. FIG. 2A illustrates screen view 210 of an electronic device 200 demonstrating a method of selecting contacts for a push-to-talk (PTT) call in accordance with some embodiments. Screen view 210 depicts an electronic device 200 having a touch-sensitive display 204, a fixed keypad 203, and a push-to-talk (PTT) key 202. Because the user has entered the phone book application, therefore contacts C1 251, C2 252, C3 253, etc. are displayed on the touch-sensitive display 204. In the example of FIG. 2, the PTT key 202 is a target key and is a hard key with fixed functionality i.e. Push-to-Talk.

The screen view 210 illustrates a first path 205 that originates from the call contact C1 251 and terminates at the edge of the display 204 near the PTT key 202. Based on the starting point and ending point (when the path reaches the edge of the display 204) of the path 205, the device stores the call contact C1 251 and the function associated with the target key, i.e. PTT key, in a memory of the device. Additionally, the screen view 210 also shows a second path 215 which starts from the call contact C2 252 and ends at the edge of the touch-sensitive display 204 near the PTT key 202. The device then stores a second call contact C2 252 and the function associated with the PTT key 202 in a memory of the device. Therefore, FIG. 2A shows selection of two call contacts C1 251 and C2 252. After storing call contacts C1 251 and C2 252, the user presses the PTT key 202 which results in setting up a call between the user and the two selected call contacts C1 251 and C2 252. Note that in the example of FIG. 2A only the starting point selects an element. If the second path 215 had crossed C1 251, path 215 would still select only one element to associate with the PTT key 202. Also note that, the display 204 may not show all contacts at the same time. In such a case, the user may select one element and function, scroll through the contacts, select another element and a function, etc. Therefore, by using this method the user can select multiple elements using multiple paths.

FIG. 2B illustrates screen view 220 of an electronic device 200 demonstrating another method of selecting contacts in accordance with some other embodiments. FIG. 2B provides an implementation that can select more than one element using a single path. Screen view 220 depicts an electronic device 200 having a touch-sensitive display 204 displaying contacts C1 251, C2 252, C3 523, etc., a fixed keypad 203, and a push-to-talk (PTT) key 202. In the example of FIG. 2B, the PTT key 202 will be the target key. The path 225, shown in the screen view 220, starts from the contact C2 252 and crosses through contact C2 251 and ends at the edge of the touch-sensitive display 204 near the PTT key 202. In this example, the device receives an input that selects two contacts, e.g., C1 251 and C2 252, using a single path 225. Therefore, FIG. 2B shows selection of call contacts C1 251 and C2 252 with a single input path. Then the device stores both the contacts C1 251 and C2 252 and the function associated with the PTT key 202 in a memory of the device. After the device has stored both contacts C1 251, C2 252 associated with the target key 202, the user presses the PTT key 202 which results in setting up a PTT call between the user and the two call contacts C1 251 and C2 252. As a result, the user can easily select multiple elements and a single function using a single path.

If using a single line to select certain elements is difficult, the techniques shown in FIG. 2A and FIG. 2B can be combined. A user can use one type of path to select two elements and another type of path to select one element. Because the selected elements are stored with the selected function, the two groups of selections can be concatenated in a memory to result in three selected elements.

In another embodiment, the user can select an element(s) without a path directly touching the element(s). Instead, the path encircles elements to select them. FIG. 2C illustrates screen view 230 of an electronic device 200 demonstrating various methods of selecting contacts in accordance with one such embodiment. Screen view 230 depicts an electronic device 200 having a touch-sensitive display 204 displaying contacts C1 251, C2 252, C3 253, C4 254, C5 255, C6 256, C7 257, etc., a fixed keypad 203, and a push to talk (PTT) key 202. In the example of FIG. 2C, the PTT key 202 will be the target key. The path 235 encircles contacts C1 251, C2 252, C4 254, and C5 255 and terminates at the edge of the display 204, near the PTT key 202, as shown in the screen view 230. Because the path 225 encircles contacts C1 251, C2 252, C4 254, and C5 255 all these four contacts are selected. Therefore, FIG. 2C shows selection of call contacts C1 251, C2 252, C4 254, and C5 255 using a single path 235. Then the device stores the contacts C1 251, C2 252, C4 254, and C5 255 and the function associated with the PTT key 202 in a memory of the device. After the device has stored all four contacts C1 251, C2 252, C4 254, and C5 255 associated with the target key 202, the user presses the PTT key 202 which results in setting up a PTT call between the user and the call contacts C1 251, C2 252, C4 254, and C5 255. Therefore, the user is able to easily select a desired number of contacts and a single function.

One or more of these examples of FIGS. 2A-2C can be used to select one, two, or a group of displayed elements and associate them with a function. For example, if the user wishes to call a contact C1, then the user selects the contact C1 using one of the methods as described by FIGS. 2A-2C. The user may select contact C1 by dragging a finger from the contact C1 to an edge of the touch sensitive display near the call key. Therefore, in this example, the device receives an input that selects C1. Then, because the user drags his finger from the contact C1 to the bottom-left edge of the display 204 near the call key, the device calculates the call key to be the target key. After calculating the target key, the device stores the contact C1 and the associated target key function in a memory of the device. After the device has stored the contact and the call key function, the user presses the call key, which results in setting up a PTT call between the user and the call contact C1. Thus, by using a combination of a touch operation and a key operation, the user can easily setup a call with a call contact. In another example, the user may want to send a message to multiple users. In this case, the user selects multiple contacts by using one of the methods illustrated by FIGS. 2A-2C. The user may encircle the contacts C1 252, C2 252, C3 253, and C4 254 by dragging a finger around these four contacts and then dragging the finger at the edge of the display near a message key (not shown). Because the finger is dragged towards the message key, the device determines that the message key is the target key. Now, the device stores these selected contacts as new message "recipients". At this point, the user may compose a message. Then, in this example, the user presses the message key and the device sends the message to the selected contacts C1 252, C2 252, C3 253, and C4 254.

In yet another example, the user may want to delete contacts from the phone book using an end key. The user selects the contacts that are to be deleted by using one of the methods illustrated by FIGS. 2A-2C. In this example the user drags a finger along a path that originates from contact C1 251 and terminates at the bottom-right edge of the display near the end key. Because the path terminates at the edge of the display near the end key, the end key is determined to be the target key. Then the device stores the selected contacts and the function associated with the end key. After the device has stored both the contacts associated with the target key, the user presses the end key which results in deleting the selected contacts. However, in such a case, it should be noted that the edge of the display has two keys i.e. the call key and the end key and it maybe difficult for the device to determine a target key as the keys can be placed next to each other on the keypad. Therefore, the device can use the methods described below in FIGS. 3A-3B for determining the target key.

Figure 3A:
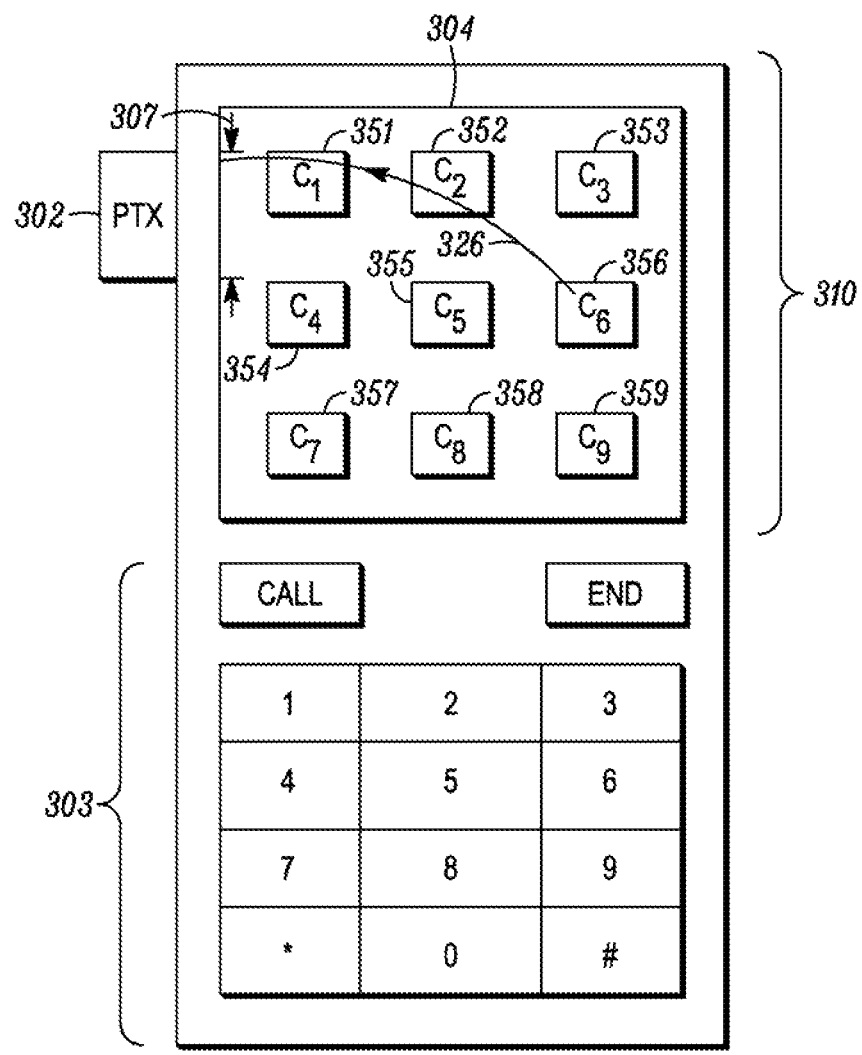
FIGS. 3A-3B are screen views of an electronic device demonstrating various methods of selecting a target key in accordance with some embodiments.
Figure 3B:
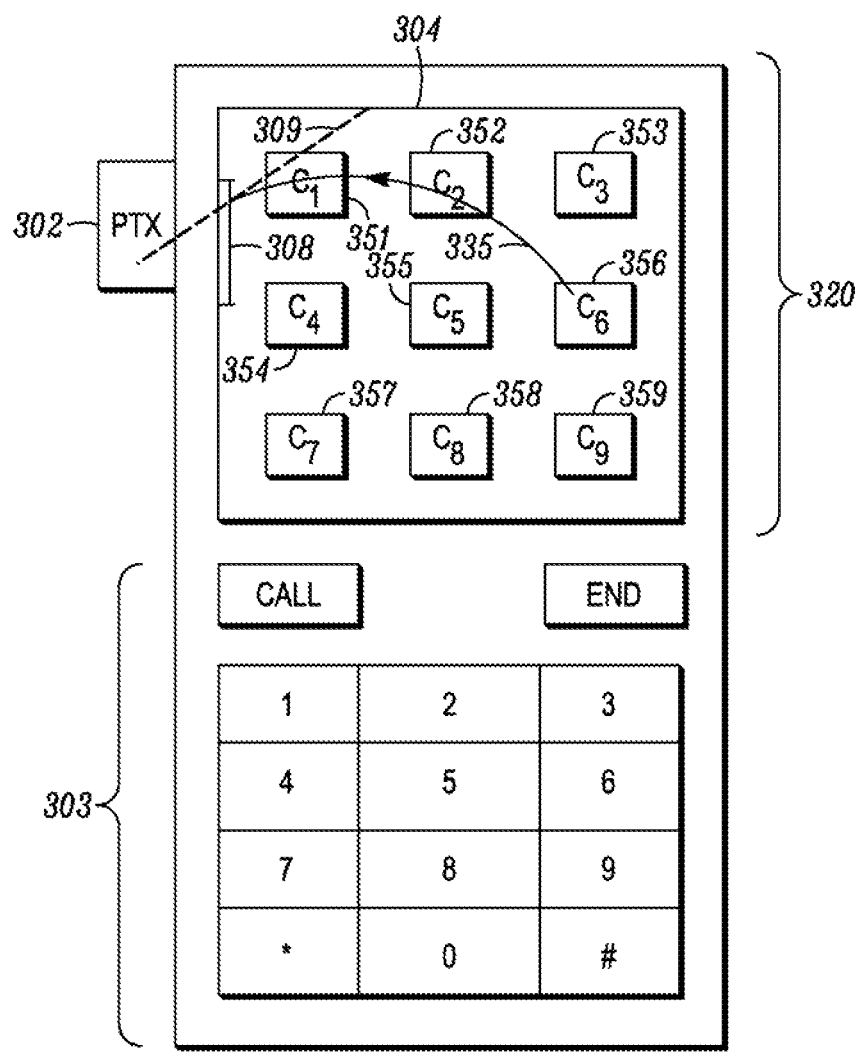

FIGS. 3A-3B illustrate screen views 310 and 320 of an electronic device 300 demonstrating various methods of selecting a target key in accordance with some embodiments. Screen view 310 depicts an electronic device 300 having a touch-sensitive display 304 displaying contacts C1 351, C2 352, C3 353, etc., a fixed keypad 303, and a push to experience (PTX) key 302. In this example, the displayed data files may represent multimedia files, word documents, software applications, etc.

Then, in accordance with the example of FIG. 3A, the user selects the contacts C1 351, C2 352, C6 356 by dragging his finger on the touch-sensitive display 304 starting from the contact C6 356 to contact C2 352 then to contact C1 351 and then finally towards the edge of the display 304 towards the PTX key 302, i.e. along a first path 326, as shown in screen view 310.

Because the path 326 starts or crosses through three elements, and ends at an edge of the display 304 adjacent to the PTX key 302, the device stores the three contacts C1 351, C2 352, and C6 356 associated with the PTX function. Note that in the example of FIG. 3A, the screen view 310 has a static edge projection 307. The static edge may be a visible projection of the target key on the display or may be a feature in the software of the user interface. The static edge projection 307 is an orthogonal projection, of the target key, on the edge of the display 304 adjacent to the target key. The static projection is used to determine a target key when multiple keys are present at the edge of the display. So, when the user drags a finger towards a target key near the edge of the display 304, then the device determines a particular key to be the target key only if the finger touches the region allotted to the key, i.e., the static projection of the key. Therefore, the static projection 307 defines the region on the edge of the display which is allotted to the target key.

The example of FIG. 3B illustrates another method for selecting a target key. Screen view 320 depicts an electronic device 300 having a touch-sensitive display 304 displaying contacts C1 351, C2 352, C3 353, etc., a fixed keypad 303, and a push to experience (PTX) key 302.

Then, in accordance with the example of FIG. 3B, the user selects the contacts C1 351, C2 352, C6 356 by dragging a finger on the touch-sensitive display 304 starting from the contact C6 356 to contact C2 352 then to contact C1 351 and then finally towards the edge of the display 304 towards the PTX key 302, i.e. along a first path 335, as shown in screen view 320. As a result, the device receives input selecting contacts C1 351, C2 352, and C6 356. Because the path ends at an edge of the display 304 adjacent to the PTX key 302, the device stores the three contacts C1 351, C2 352, and C6 356 associated with the PTX function in a memory of the device.

The screen view 320 shown in FIG. 3B shows a tangent 309 of the first path 335 at the edge of the touch-sensitive display 304. In the example of FIG. 3B, the device determines the target key 302 based on the direction of the tangent 309. In other words, in the example of FIG. 3, the tangent 309 points towards the PTX key 302, therefore the device determines the PTX key 302 to be the target key.

Note that in the example of FIG. 3B, the screen view 320 has a shifting edge projection 308. The shifting edge may be a visible projection of the target key on the display or may be a feature in the software of the user interface. The shifting edge projection 308 is a movable projection, as the name suggests, which shifts according to the angle the tangent 309 makes with the edge of the touch-sensitive display 304. The movability of the projection 308 does not make it necessary for the user to always point directly at the target key. If the user misses pointing towards the target key by a few millimeters, the shifting of the projection 308 based on the angle that the tangent 309 makes with the edge of the display 304 helps in determining the target key 302. Using the description of FIGS. 2-3, various scenarios of performing a function are demonstrated in FIGS. 4-5.

Figure 4A:
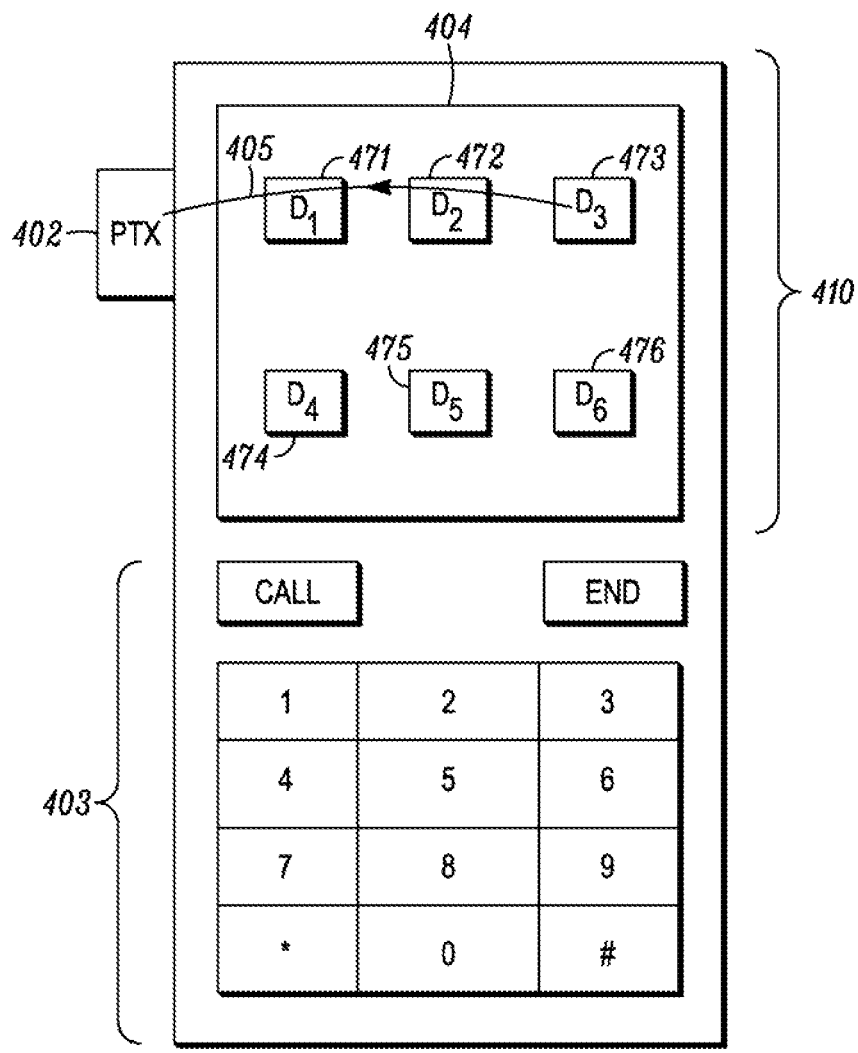
FIGS. 4A-4B are screen views of an electronic device demonstrating an exemplary process for performing a function in accordance with some embodiments.
Figure 4B:
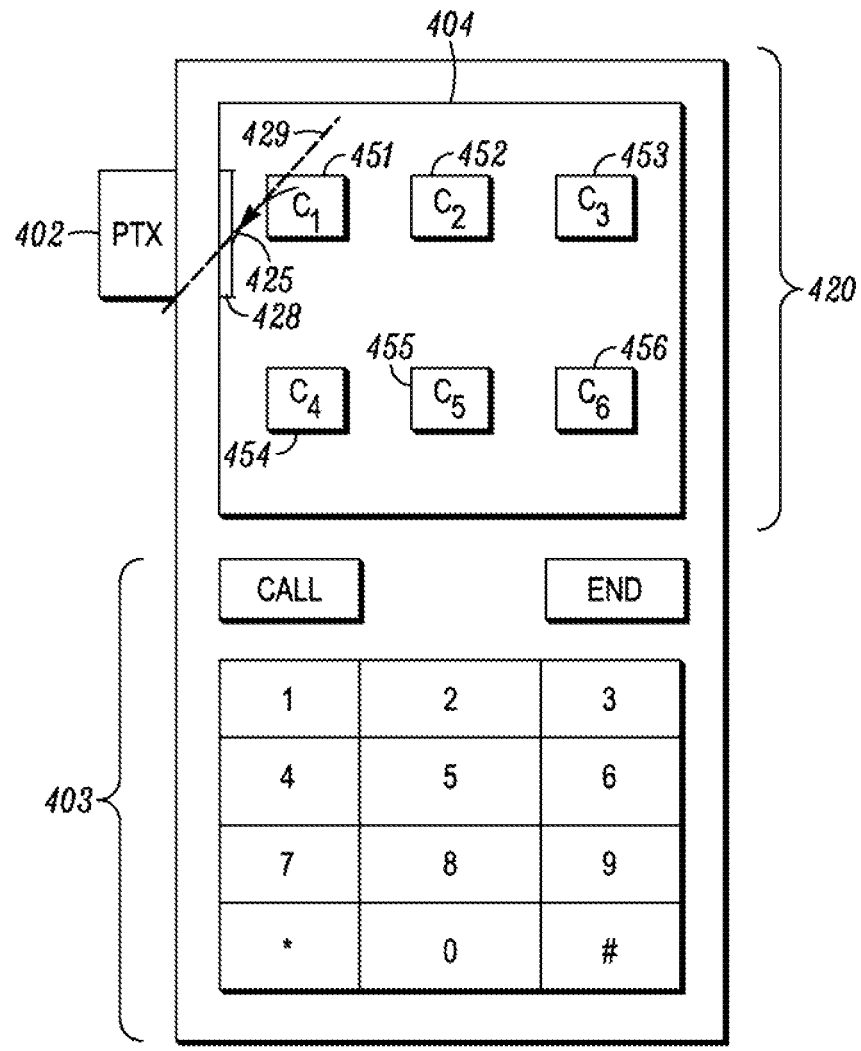

FIGS. 4A-4B illustrate screen views 410, 420 of an electronic device 400 demonstrating exemplary processes for performing a function in accordance with some embodiments. FIG. 4A illustrates a screen view 410 of an electronic device 400 depicting an electronic device 400 having a touch-sensitive display 404 displaying data files D1 471, D2 472, D3 473, etc., a fixed keypad 403, and a push to experience (PTX) key 402. In this example, the displayed data files may represent multimedia files, word documents, software applications, etc.

In the example of FIG. 4A, the user selects data files D1 471, D2 472, and D3 476 using one of the methods illustrated by FIGS. 2A-2C. The user selects data files D1 471, D2 472, and D3 476 by dragging a finger along path 405. Further, because the path 405 terminates at the edge of the display 404 near the PTX key 402, the PTX key 402 is determined to be the target key. The PTX key 402 is determined to be the target key using the one of the methods illustrated by FIGS. 3A-3B. Because the user has selected data files D1 471, D2 471, D3 473 and the PTX key is the target key, the device determines that the device has to transmit the selected file using a PTX communication. Therefore, the screen view 410 changes to screen view 420, and the device displays contacts C1 451, C2 452, C3 453, etc. on the touch-sensitive display 404, as shown in screen view 420.

Then in the example of FIG. 4B, the user selects C1 451 by dragging a finger from C1 451 to the edge of the touch-sensitive display 404, i.e. along a second path 425, as shown in screen view 420. The screen view 420 also shows a tangent 429 of the second path 425 at the edge of the display 404. The tangent 429 determines the target key. In another example, the tangent also determines the function that needs to be performed on the selected contact. In the example of FIG. 4, the target key is the PTT key 402 and the function to be performed is transmitting the selected data files D1 471, D2 472, and D3 473 to the selected contact C1 451. Additionally, the screen view 420 also displays a projection 428. The projection 428 is a movable projection which moves according to the angle the tangent 429 makes with the edge of the display 404 thus making it easier for the user to point towards a target key 402.

In another example, the user may first select a contact and a function, and then select data files and function. Pressing the target key will result in setting up a call with the selected contacts and sending the selected data files to the contacts. Thus, the user can easily perform a desired function by using a touch operation and a key operation for selecting elements and for selecting a function that is to be performed on the selected element.

Figure 5:
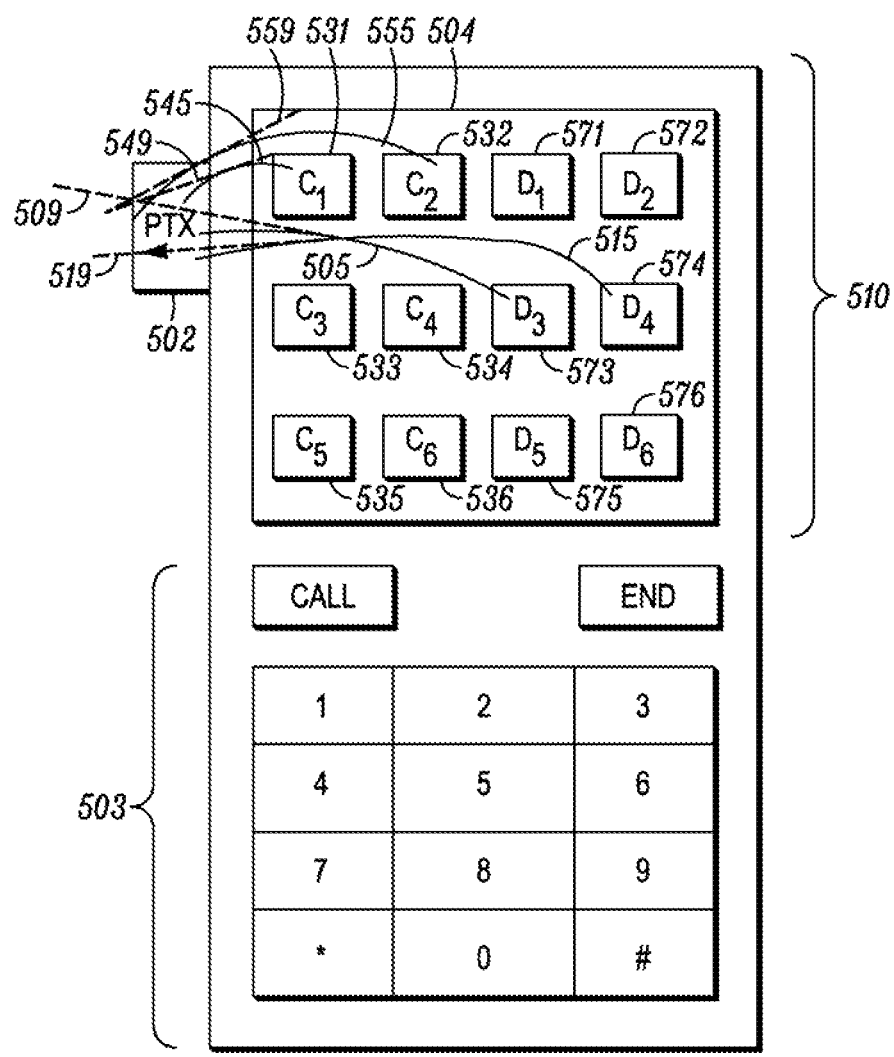
FIG. 5 is a screen view of an electronic device demonstrating an exemplary process for performing a function in accordance with some embodiments.

FIG. 5 illustrates a screen view 510 of an electronic device 500 demonstrating an exemplary process for performing a function in accordance with some embodiments. Screen view 510 depicts an electronic device 500 displaying simultaneously contacts C1 531, C2 532, C3 533, etc. and data files D1 571, D2 572, D3 573, etc. on the touch-sensitive display 504. The electronic device 500 also includes a fixed keypad 503, and a push to experience (PTX) key 502. Then in accordance to the example of FIG. 5, the user first selects D3 573 by dragging a finger along path 505. Then, the user selects D4 574 by dragging a finger along path 515. It should be noted that in the example of FIG. 5 only the start of the path selects the data file. If the user crosses through another contact/data file, then the device does not select that contact/data file. As a result of dragging a finger along two paths 505, 515, the device 500 receives a first input that selects data file D3 573 and then receives a second input that selects the data file D4 574. The screen view 510 also shows tangents 509, 519 of the path 505, 515 at the edge of the display 504. In the example of FIG. 5, the device determines the target key 502 based on the direction of the tangents 509, 519. Then the device stores the data files D3 573 and D4 574 and the function associated with the target key 502 (e.g., PTX function).

After storing, the device 500 determines if the selected data files are to be transmitted to a user based on the type of files selected and the target key. In the example of FIG. 5, because the selected elements are data files and the target key is the PTX key 502, the device 500 determines that the user wants to send the selected files using push-to-talk communication.

Then, in accordance with the example of FIG. 5, the user selects contacts C1 531 by dragging a finger along another path 545. The path 545 starts from C1 531 and terminates at the edge of the display 504 near the PTX key 502 thereby selecting the call contact C1 531. Then, in the example of FIG. 5, the user selects contact C2 532 by dragging a finger along path 555. The path 555 starts from C2 532 and terminates at the edge of the display 504 near the PTX key 502. The screen view 510 also shows tangents 559, 549 to the paths 555, 545 at the edge of the display 504. The tangents 559, 549 determine the target key 502 and the target key 502 determines the function that is to be performed on the selected call contacts C2 532 and C1 531. Now, the contacts C1 531 and C2 532 and the function associated with the target key 502 are stored in the device. Then, the user presses the PTX key 502. In response, the required function is performed on the selected data files and the selected contacts i.e. the selected data files are sent to the selected contacts.

As a result, the user is able to perform a desired function on the selected element(s) easily and in a few simple touch-strokes and one key-press.

Figure 6:
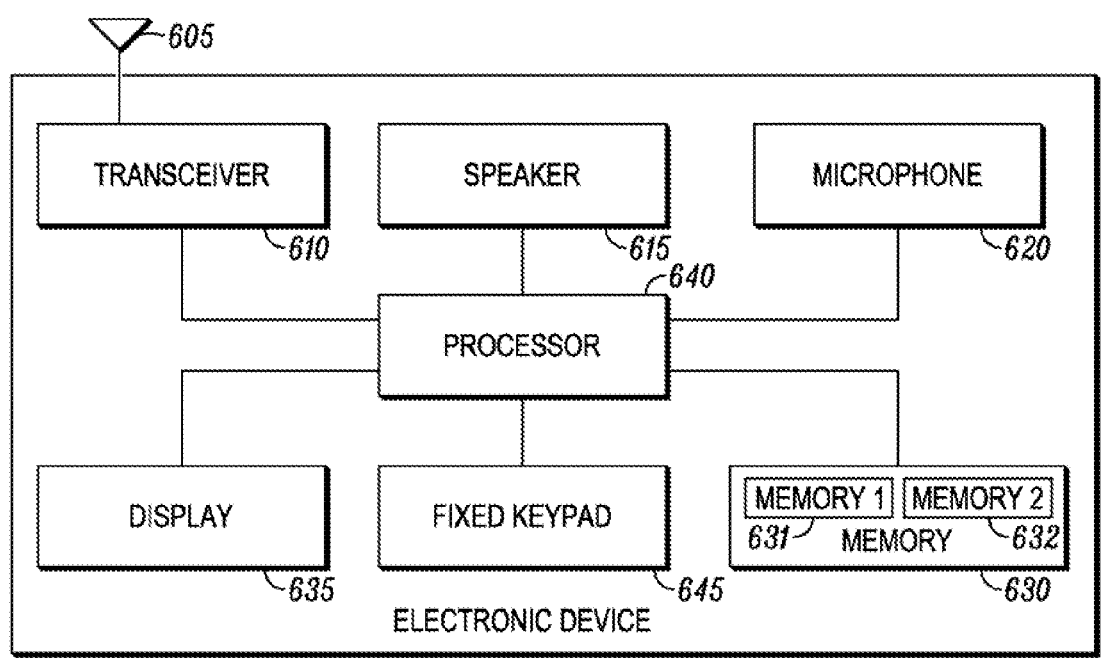
FIG. 6 is a block diagram of an electronic device in accordance with some embodiments.

FIG. 6 shows a block diagram of an electronic device 600 in accordance with an embodiment. Although the electronic device is shown as a wireless communication device, the electronic device could be a computer (laptop, desktop, handheld, etc.), a personal digital assistant (with or without a wireless connection), a gaming console, or a wide variety of electronic devices with graphical user interfaces and physical buttons/keys. The block diagram of the electronic device 600 includes a display 635, a physical keypad 645, a microphone 620, a speaker 615, an antenna 605, a transceiver 610, a processor 640, and a memory 630. The display 635 is a touch-sensitive display. Although it has been assumed that the display 635 is touch-sensitive, other graphical user interface displays may be used in alternate implementations. For example, the display may be a standard (e.g., LCD, LED) display and the touch-input can be replaced by a mouse input, a touchpad input, or another non-key-based graphical user interface input. The display 635 displays a set of elements. The microphone 620 is responsible for converting received audio signals into electrical signals for transmission, and the speaker 615 is responsible for converting electrical signals into audio signals. These signals can be received and transmitted via the transmitter in the transceiver 610 through the antenna 605. The transceiver 610 combines the transmission and the reception capabilities of the electronic device 600. The processor 640 is coupled to all the other parts of the electronic device.

The processor 640 receives a first input on the touch-sensitive display 635 that selects one or more element(s) from the first set of elements. The first set of element may be a set of call contacts, a set of data files, a list of software programs, etc. Then, in response to receiving the input, the processor 640 determines that the first input has continued on a path from the selected element(s) to an edge of the touch-sensitive display 635 and also calculates the target key based on characteristic(s) of the path. The target key is a physical key present on the physical or fixed keypad and implements as either a hard key or a soft key. A hard key is a key that has a fixed functionality associated with it. Meanwhile, a soft key is a key whose functionality can be changed by the software application currently in use by the device. Then based on the type of element and the target key, the processor 640 determines a function to be performed on the selected elements. After determining the function, the selected elements and the function associated with the target key are stored in the memory 630. The memory 630 has two parts i.e. a first memory 631 and a second memory 632. The first memory 631 stores the selected element(s). The second memory 632 stores the function associated with the selected elements (as determined from the target key).

Then the processor 640 determines if the function involves transmitting the selected element(s) as data. If the function does not involve transmitting, then the processor 640 senses if the target key has been activated. If the target key has been activated then the processor 640 performs a function associated with the target key and the selected element(s).

If however, the processor 640 determines that the target key has not been activated and instead the processor 640 receives another input on the touch-sensitive display 635, then the processor 640 discards the selected element and the function associated with the selected element stored in the memory 630 and restarts the whole process.

In another embodiment, the processor 640 waits for a predetermined amount of time from the time of receiving an input. If the target key is not activated within the predetermined amount of time then selected element(s) and the function stored in the memory 630 are discarded and the process of performing a function is restarted.

If, however, the processor 640 determines that the function involves transmitting the at least one selected element as data, then the processor 640 receives a second input on the touch-sensitive display that selects other element(s) from a second set of elements displayed on the touch-sensitive display. The second set of element may be same as the first set of elements or may be different from the first set of elements. Then the processor 640 senses that the second input has continued on a second path from the at least another element to an edge of the display and also calculates the target key based on at least one characteristic of the second path. Then the processor checks if the target key has been activated. In response to the activation of the target key, the processor 640 performs the function associated with the target key, the selected element(s), and the at least another selected element.

Optionally, a backlight is associated with the target key. The backlight of the target key flashes after the processor calculates the target key so that the user can easily see which key the device has determined to be the target key. Also, the backlight may flash in a predetermined manner based on the at least one element. For example, if the user has selected call contacts, then the backlight may always stay on. However, if the user has selected data files, then the backlight may flash at a pre-determined interval. Alternately, if the device determines two elements have been selected using a single path, the backlight might flash twice (once for each element saved). In some other embodiments, a vibrator or a speaker may be activated as the target key is determined The speaker may be used to provide an audio feedback to the user. For example, the device may beep a predetermined number of times based on the target key or the number of selected elements. Similarly, in some other embodiments the vibrator may be used to provide haptic feedback to the user. For example, the device may vibrate based on the target key or the number of selected elements.

Thus, by using a touch operation and a key operation the user is able to easily select element(s) and perform a function on the selected element(s).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for performing a function in an electronic device, the method comprising:
    displaying a first set of elements and a second set of elements on a display;
    receiving a first input, wherein the first input selects at least one element from the first set of elements;
    determining that the first input has continued on a first path from the at least one element to an edge of the display;
    calculating a physical target key beyond the edge of the display based on at least one characteristic of the first path;
    receiving a second input, wherein the second input selects at least another element from the second set of elements;
    determining that the second input has continued on a second path from the at least another element to an edge of the display;
    calculating the target key based on the second path; and
    after sensing an activation of the target key, if the target key is calculated based on at least one characteristic of the second path, then performing the function associated with the target key, the at least one selected element, and the at least another selected element.

2. The method of claim 1, wherein the first set of elements includes at least one element, wherein the at least one element is one of: a contact file, a telephone number, an image file, a software application program, an audio file, and a video file.

3. The method of claim 1 further comprising:
    storing the at least one element along with the function associated with the target key, after the calculating.

4. The method of claim 1 further comprising:
    wherein the function associated with the target key involves transmitting the at least one selected element as data.

5. The method of claim 1, wherein the second set of elements is different from the first set of elements.

6. The method of claim 1, wherein the second set of elements is same as the first set of elements.

7. The method of claim 1, wherein the at least one characteristic of the path includes a direction of a tangent of the path at the edge of the display.

8. The method of claim 7 further comprising:
    forming a projection of the target key on the display, wherein the projection is displayed adjacent to the target key; and
    shifting the projection of the target key based on an angle formed by the tangent with the edge of the display.

9. The method of claim 1, wherein the at least one characteristic of the path includes a number of times the path crosses itself.

10. The method of claim 1, wherein the at least one characteristic of the path selects the function to be performed on the at least one selected element.

11. The method of claim 1 further comprising:
    flashing a backlight of the target key after the calculating a target key.

12. An electronic device comprising:
    a display for displaying a first set of elements and a second set of elements;
    a housing having at least a physical target key outside the display boundaries; and
    a processor for:
    receiving a first input that selects at least one element from the first set of elements;
    determining that the first input has continued on a first path from the at least one element to an edge of the display;
    calculating the target key based on at least one characteristic of the first path;
    receiving a second input, wherein the second input selects at least another element from the second set of elements;
    determining that the second input has continued on a second path from the at least another element to an edge of the display;
    calculating the target key based on the second path;
    after sensing an activation of the target key, if the target key is calculated based on at least one characteristic of the second path, then performing the function associated with the target key, the at least one selected element, and the at least another selected element.

13. The electronic device of claim 12 further comprising:
    a first memory for storing the at least one element.

14. The electronic device of claim 13 further comprising:
    a second memory for storing the function associated with the at least one element stored on the first memory and the target key.

15. The electronic device of claim 12, wherein the target key is a hard key having a fixed function.

16. The electronic device of claim 12, wherein the target key is a soft key having a variable function.

17. The electronic device of claim 12 further comprises:
    a backlight associated the target key, wherein the backlight of the target key flashes after the processor calculates the target key.

18. The electronic device of claim 12 further comprises:
    a speaker coupled to the target key, wherein the speaker provides an audio feedback after the processor calculates the target key.

19. The electronic device of claim 12 further comprises:
    a vibrator coupled to the target key, wherein the vibrator provides a haptic feedback after the processor calculates the target key.

* * * * *